US008264541B2

(12) United States Patent
Chen et al.

(10) Patent No.: US 8,264,541 B2
(45) Date of Patent: Sep. 11, 2012

(54) COMPOUND CAMERA AND METHODS FOR IMPLEMENTING AUTO-FOCUS, DEPTH-OF-FIELD AND HIGH-RESOLUTION FUNCTIONS

(75) Inventors: George Q. Chen, San Diego, CA (US); Li Hong, San Diego, CA (US); Peter McGuinness, Poway, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 1299 days.

(21) Appl. No.: 12/004,452

(22) Filed: Dec. 20, 2007

(65) Prior Publication Data

US 2008/0198220 A1 Aug. 21, 2008

Related U.S. Application Data

(63) Continuation of application No. 10/407,490, filed on Apr. 4, 2003, now Pat. No. 7,425,984.

(51) Int. Cl.
*H04N 7/18* (2006.01)
(52) U.S. Cl. ...................................................... 348/159
(58) Field of Classification Search .................. 348/159, 348/160–161, 42–49, 218.1, 239; 382/103, 382/154, 294; 345/587; *H04N 7/18, 5/262, H04N 5/225*
See application file for complete search history.

(56) References Cited

U.S. PATENT DOCUMENTS

| 6,445,815 B1 * | 9/2002 | Sato ............................... 382/154 |
| 6,469,710 B1 * | 10/2002 | Shum et al. .................... 345/619 |
| 6,975,329 B2 * | 12/2005 | Bastos et al. .................. 345/587 |
| 6,990,681 B2 * | 1/2006 | Wang et al. .................... 725/105 |
| 7,003,136 B1 * | 2/2006 | Harville ........................ 382/103 |
| 7,006,709 B2 * | 2/2006 | Kang et al. .................... 382/294 |
| 7,084,904 B2 * | 8/2006 | Liu et al. ..................... 348/218.1 |
| 7,085,409 B2 * | 8/2006 | Sawhney et al. ............... 382/154 |
| 2003/0146922 A1 * | 8/2003 | Navab et al. .................. 345/633 |

FOREIGN PATENT DOCUMENTS

EP 1081654 A2 * 3/2001

* cited by examiner

*Primary Examiner* — Tung Vo

(57) ABSTRACT

A compound camera system for generating an enhanced virtual image having a large depth-of-field. The compound camera system comprises a plurality of component cameras for generating image data of an object and a data processor for generating the enhanced virtual image from the image data. The data processor generates the enhanced virtual image by generating a first component virtual image at a first depth plane, generating a second component virtual image at a second depth plane, and inserting first selected pixels from the first component virtual image into enhanced the virtual image and inserting second selected pixels from the second component virtual image into the enhanced virtual image.

20 Claims, 2 Drawing Sheets

COMPOUND CAMERA AND METHODS FOR IMPLEMENTING AUTO-FOCUS, DEPTH-OF-FIELD AND HIGH-RESOLUTION FUNCTIONS

This application is a continuation of prior U.S. patent application Ser. No. 10/407,490 filed on Apr. 4, 2003 now U.S. Pat. No. 7,425,984.

CROSS-REFERENCE TO RELATED APPLICATIONS

The present invention is related to those disclosed in U.S. patent application Ser. No. 10/407,505, filed concurrently herewith, entitled "Compound Camera and Method for Synthesizing a Virtual Image From Multiple Input Images." Application Ser. No. 10/407,505 is commonly assigned to the assignee of the present invention. The disclosures of this related patent application is hereby incorporated by reference for all purposes as if fully set forth herein.

TECHNICAL FIELD OF THE INVENTION

The present invention is generally directed to image processing devices and, in particular, to a compound camera that generates virtual images from a plurality of input images captured by the compound camera.

BACKGROUND OF THE INVENTION

A compound camera consists of a set of component cameras, a data processor and image processing software that runs on the data processor. The component cameras may be synchronized through wired or wireless electronic signals. Individual images from the component cameras are transmitted to the data processor through wired or wireless connections. The image processing software takes images from the component cameras as input and synthesizes an output image following the specifications of a virtual camera.

A conventional compound camera may be implemented in a number of ways. In a first conventional embodiment, a compound camera may comprise a number of synchronized regular video cameras and a separate microprocessor connected to the video component cameras. In a second conventional embodiment, a plurality of component image sensors and a microprocessor may be integrated on one substrate, such as a printed circuit board (PCB) or a hybrid substrate. Synchronization and communication are accomplished through the printed circuit connections on the substrate. In a third conventional embodiment, the component image sensors and the microprocessor are very small and are integrated on a single silicon chip.

The physical model of a camera consists of a shutter, a lens and an image plane. The shutter has an opening called an aperture that lets light enter into the camera. A bundle of light rays coming out of a point on an object surface enters through the aperture, is refracted by the lens, and is gathered and focused on the image plane, where the color of the object point is recorded.

For a certain aperture size, there is a range of depth within which the image is sharp. This is called the "depth-of-field" and it is inversely proportional to the aperture size. The image plane slides back and forth to search for the best overall image within the range of the depth-of-field. Normally, large depth-of-field coverage is desired. This, in turn, requires high sensitivity from the sensor because the aperture size is proportionally small.

Traditional cameras rely on complex optical and mechanical components to realize the change of focus and aperture. Physical conditions limit the maximum resolution a camera can achieve. In a compound camera, these features may be implemented digitally by running the image processing software on the microprocessor.

However, the prior art conventional compound camera image processing systems mainly focus on two areas. In computer vision, the common practice is to first recover the 3-dimensional geometry of the objects in the scene. This is called structure-from-motion. Next, the input images are transferred to the virtual camera via the recovered geometry. A good reference is Olivier Faugeras, "Three Dimensional Computer Visions—A Geometric Viewpoint," The MIT Press, 1996. The disclosure of the Faugeras text is hereby incorporated by reference for all purposes as if fully set forth herein. The problem of this approach is that the reconstructed geometry normally is not very accurate, especially on object surfaces that lack color texture. This result in visible artifacts in the synthesized image.

In computer graphics, the light field approach can be thought of as using only one depth plane. A good reference for the light field approach is M. Levoy and P. Hanrahan, "Light Field Rendering," Proceedings of the ACM SIGGRAPH 96", pp. 31-42, 1996. The disclosures of the Levoy and Hanrahan text is hereby incorporated by reference for all purposes as if fully set forth herein. However, in the light field approach, in order to deal with blur, the component cameras must be densely placed. Densely placed cameras normally imply a large number of cameras. A large number of cameras, in turn, produce a large amount of data to be processed. This vastly increases the cost and complexity of the image processing system.

Therefore, there is a need in the art for improved apparatuses and methods for processing video images. In particular, there is a need for image processing systems that implement improved auto-focus, high-resolution, and depth-of-field functions.

SUMMARY OF THE INVENTION

To address the above-discussed deficiencies of the prior art, it is a primary object of the present invention to provide a compound camera system capable of generating an enhanced virtual image having a large depth-of-field. According to an advantageous embodiment of the present invention, the compound camera system comprises: 1) a plurality of component cameras capable of generating image data of an object; and 2) a data processor capable of receiving image data from the plurality of component cameras and generating the enhanced virtual image. The data processor generates the enhanced virtual image by generating a first component virtual image at a first depth plane, generating a second component virtual image at a second depth plane, and inserting first selected pixels from the first component virtual image into enhanced the virtual image and inserting second selected pixels from the second component virtual image into the enhanced virtual image to thereby generate the enhanced virtual image.

According to one embodiment of the present invention, the data processor selects the first selected pixels from the first component virtual image and the second selected pixels from the second component virtual image by comparing an amount of blur of corresponding pixels from the first and second component virtual images and selecting pixels that have the least amount of blur from each of the first and second component virtual images.

According to another embodiment of the present invention, the data processor selects the pixels that have the least amount of blur by selecting pixels from each of the first and second component virtual images that have the least amount of color variance.

According to still another embodiment of the present invention, the data processor generates the first component virtual image by back-projecting virtual pixel data (u,v) to generate point data (x,y,z) located at the first depth plane of the object and then projecting the point data (x,y,z) to generate first pixel data $(u_1,v_1)$ located at the image plane of a first component camera.

According to yet another embodiment of the present invention, the data processor generates the first component virtual image by projecting point data (x,y,z) located at the first depth plane to generate second pixel data $(u_2,v_2)$ located at the image plane of a second component camera.

According to a further embodiment of the present invention, the data processor generates the first component virtual image by combining color of the first pixel data $(u_1,v_1)$ and color of the second pixel data $(u_2,v_2)$.

According to a still further embodiment of the present invention, the data processor generates the second component virtual image by back-projecting virtual pixel data (u,v) to generate point data (x,y,z) located at the second depth plane of the object and then projecting the point data (x,y,z) to generate first pixel data $(u_1,v_2)$ located at the image plane of a first component camera.

According to a yet further embodiment of the present invention, the data processor generates the second component virtual image by projecting point data (x,y,z) located at the second depth plane to generate second pixel data $(u_2,v_2)$ located at the image plane of a second component camera.

According to a still further embodiment of the present invention, the data processor generates the second component virtual image by combining color of the first pixel data $(u_1,v_1)$ and color of the second pixel data $(u_2,v_2)$.

It is another primary object of the present invention to provide a compound camera system capable of generating a high-resolution virtual image. According to an advantageous embodiment of the present invention, the compound camera system comprises: 1) a plurality of component cameras capable of generating image data of an object; and 2) a data processor capable of receiving first image data from a first component camera and second image data from a second component camera and generating the high-resolution virtual image by i) back-projecting virtual pixel data (u,v) to generate point data (x,y,z) located at a depth, z=Z1, associated with a first object plane of the object; ii) projecting the point data (x,y,z) to generate first pixel data $(u_1,v_1)$ located at the image plane of the first image data; and iii) projecting the point data (x,y,z) to generate second pixel data $(u_2,v_2)$ located at the image plane of the second image data, wherein a pixel density of the virtual pixel data (u,v) is greater than a pixel density of the first pixel data $(u_1,v_1)$ and second pixel data $(u_2,v_2)$ Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged image processing system.

Initially, it should be noted that the items depicted in FIGS. 1-5 are not drawn to scale. Those skilled in the art will recognize that items in FIGS. 1-5 are drawn to show their relative positions in order to simplify the explanation of the operation of the present invention.

Figure 1:
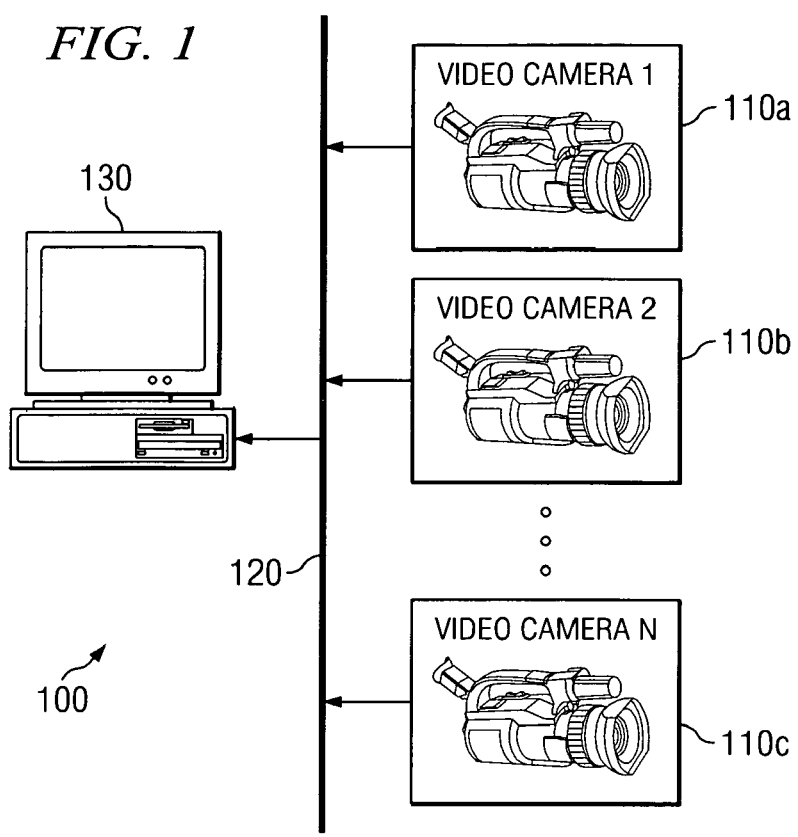
FIG. 1 illustrates a compound camera system according to a first exemplary embodiment of the present invention.

FIG. 1 illustrates compound camera system 100 according to a first exemplary embodiment of the present invention. Compound camera system 100 comprises N component video cameras 110, including exemplary component video cameras 110a, 110b, and 110c, and processing system 130. Component video cameras 110a, 110b, and 110c are arbitrarily labeled Video Camera 1, Video Camera 2, and Video Camera N, respectively. Processing system 130 and the N component video cameras 110 communicate via communication link 120. Communication link 120 may be a wired link, such as a network connection, or a wireless link.

According to an exemplary embodiment of the present invention, processing system 130 may be a personal computer (PC), a workstation, or a similar system. Component video cameras 110 are synchronized with each other and processing system 130. Individual image data from component video cameras 110 are transmitted to processing system 130, where image processing software takes the image data from component video cameras 110 as input and synthesizes an output image following the specifications of a virtual camera, as described below in greater detail.

Additionally, it should be understood that it is not required that component video cameras 110 be actual video cameras. Those skilled in the art will understand that each component is camera 110 may also be a still camera that captures image data for subsequent transfer to processing system 130.

Figure 2:
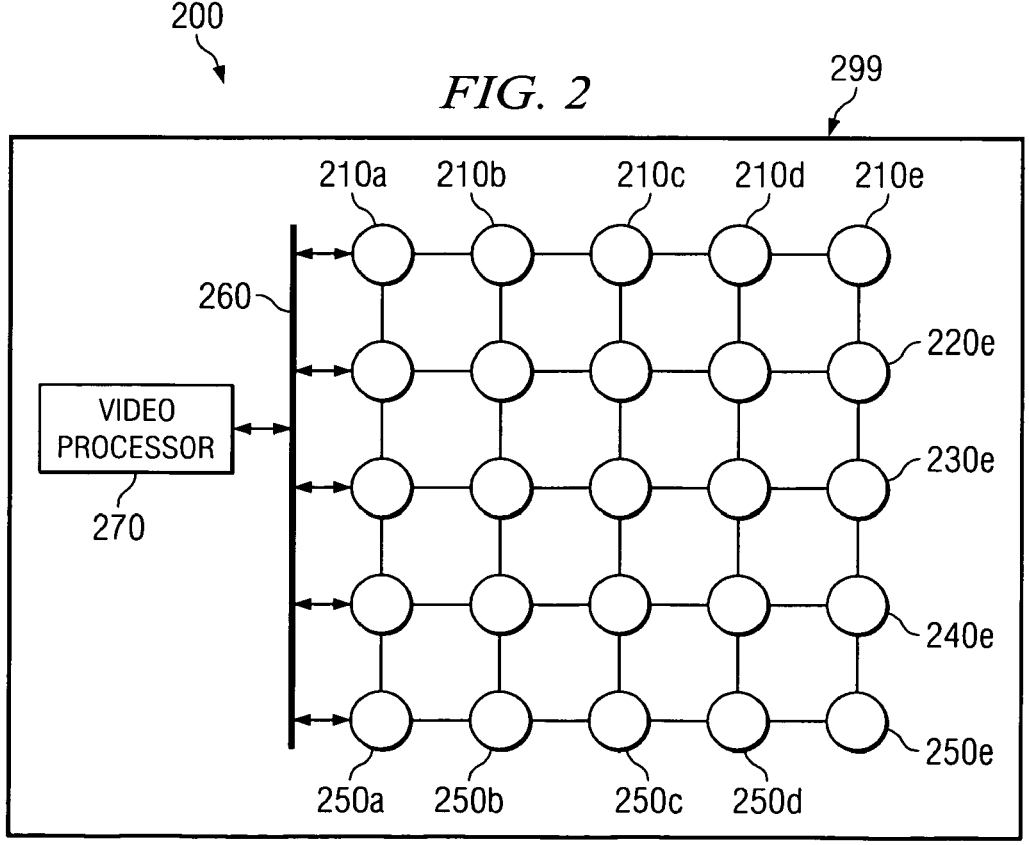
FIG. 2 illustrates a compound camera system according to a second exemplary embodiment of the present invention.

FIG. 2 illustrates compound camera system 200 according to a second exemplary embodiment of the present invention. Component camera system 200 comprises a plurality of component image sensors and video processor 270. According to an advantageous embodiment of the present invention, each of the component image sensors is a still camera capable of capturing image data for subsequent transfer to video processor 270. Additionally, it should be understood that video processor 270 is capable of processing image data other than video data. According to an advantageous embodiment, video processor 270 is capable of processing still image data.

In one embodiment of the present invention, the component image sensors and video processor 270 may be integrated on one printed circuit board (PCB) 299. In an alternate embodiment of the present invention, the component image sensors and video processor 270 may be integrated on a single integrated circuit (IC) chip 299. Synchronization and communication are accomplished through printed circuit connections 260 on PCB 299 (or IC chip 299).

The component image sensors are arranged in five rows and five columns to form a 5×5 image sensor array. The first row of the array comprises component image sensors 210a, 210b, 210c, 210d and 210e. The second row of the array comprises component image sensors 220a, 220b, 220c, 220d and 220e (only image sensor 220e is labeled). The third row of the array comprises component image sensors 230a, 230b, 230c, 230d and 230e (only image sensor 230e is labeled). The fourth row of the array comprises component image sensors 240a, 240b, 240c, 240d and 240e (only image sensor 240e is labeled). The fifth row of the array comprises component image sensor 250a, 250b, 250c, 250d and 250e.

Component image sensors 210a-e, 220a-e, 230a-e, 240a-e and 250a-e are synchronized with each other and video processor 270. Individual image data from component image sensors 210a-e, 220a-e, 230a-e, 240a-e and 250a-e are transmitted to video processor 270, where image processing software takes the image data from component image sensors 210a-e, 220a-e, 230a-e, 240a-e and 250a-e as input and synthesizes an output image following the specifications of a virtual camera, as described below in greater detail.

Figure 3:
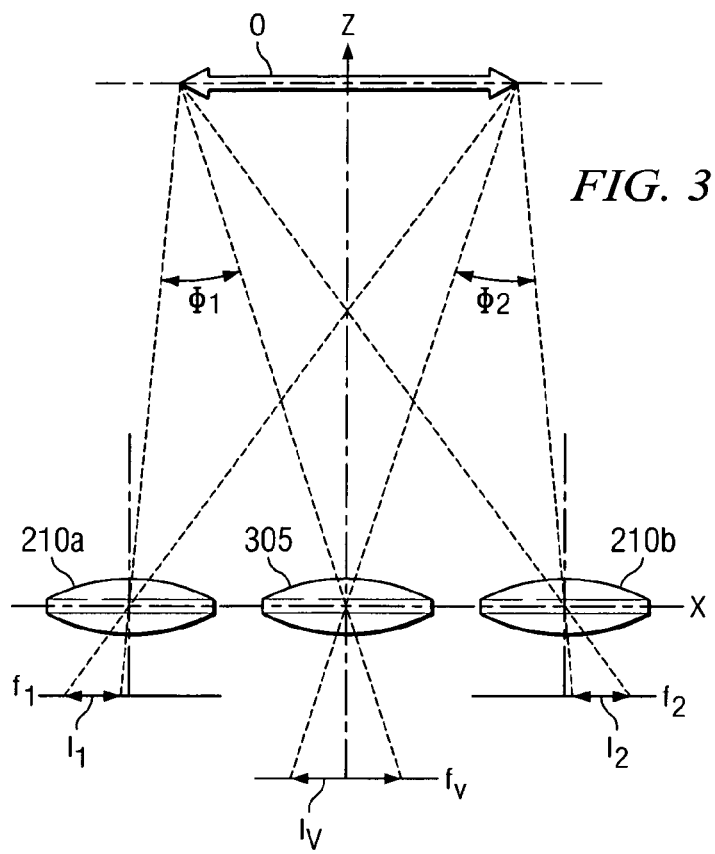
FIG. 3 is an optical arrangement illustrating the operation of a compound camera system according to the principles of the present invention.

FIG. 3 is an optical arrangement illustrating the operation of compound camera systems 100 and 200 according to the principles of the present invention. Processing system 130 (or video processor 270) generates a virtual image $I_v$ from input images acquired by the component video cameras in FIG. 1 (or the component image sensors in FIG. 2. For the sake of simplicity in explaining the generation of a virtual image by the present invention, it shall be assumed hereafter that component image sensors 210 and 210b are used to capture image data and video processor 270. However, the following description also applies to alternate embodiments of compound cameras, including the compound camera illustrated in FIG. 1.

In the illustration in FIG. 3, object O (double headed arrow) lies in the object plane (indicated by a dotted line). Component image sensor 210a produces image $I_1$ at focal length $f_1$ from object O. Component image sensor 210b produces image $I_2$ at focal length $f_2$ from object O. In the illustrated embodiment, $f_1 = f_2$. The virtual image, $I_v$, is synthesized from two input images $I_1$ and $I_2$. According to the principles of the present invention, the virtual image $I_v$ is computed as the weighted average of the transformed images:

$$I_V(u,v) = \frac{w_1 \cdot I_1(u_1, v_1) + w_2 \cdot I_2(u_2, v_2)}{w_1 + w_2}. \quad [\text{Eqn. 1a}]$$

In Equation 1a, the values $w_1$ and $w_2$ are the positive weight values: $w_1 = \cos(\phi_1)$ and $w_2 = \cos(\phi_2)$ where $\phi_1$ is the angle between the ray sent from $(u,v)$ and the ray sent from $(u_1,v_1)$, $\phi_2$ is the angle between the ray sent from $(u,v)$ and the ray sent from $(u_2,v_2)$. Based on these weighting factors, a component camera that is farther from the virtual one should contribute less weight than another camera that is closer. Furthermore, $(u_1,v_1)$ and $(u_2,v_2)$ are computed from:

$$\begin{bmatrix} u_1 \\ v_1 \\ 1 \end{bmatrix} = M_1(f, f_v, z) \cdot \begin{bmatrix} u \\ v \\ 1 \end{bmatrix} \text{ and } \begin{bmatrix} u_2 \\ v_2 \\ 1 \end{bmatrix} = M_2(f, f_v, z) \cdot \begin{bmatrix} u \\ v \\ 1 \end{bmatrix}. \quad [\text{Eqn. 1b}]$$

The value $M_1(f,f_v,z) = T_1(f, z) \cdot T_v^{-1}(f_v,z)$ and the value $M_2(f,f_v,z) = T_2(f,z) \cdot T_v^{-1}(f_v,z)$ are the combined transformations from the virtual camera image plane to the component camera image plane. Thus, $M_1$ and $M_2$ depend on the common focal length, f, of both component cameras, the virtual focal length, $f_v$, and the depth, z, of the object plane.

When there are more than two component cameras, the procedure is substantially the same as above, except that the procedure repeats more times to include all the cameras. The steps are as follows:

1) Determine the depth z of the object plane;
2) For each virtual pixel data $(u,v)$, do the following
    i) Compute the transformations $M_i(f,f_v,z)$, $i=1, \ldots, n$;
    ii) Compute the weights $w_i$;
    iii) Warp and then blend the colors such that:

$$I_v = \frac{\sum_{i=1}^{n} w_i \cdot I_i \left( M_i(f, f_v, z) \cdot \begin{bmatrix} u \\ v \\ 1 \end{bmatrix} \right)}{\sum_{i=1}^{n} w_i} \quad [\text{Eqn. 2}]$$

The transformation matrices described above are derived in the following manner. A pixel is represented on a 2-D image. plane by coordinate $(u,v)$, a point is represented in 3-D space by $(x,y,z)$, and the camera is represented by a 3-by-4 matrix $P(f)$ where f is the focal length of the camera. The process of projecting the $(x,y,z)$ to $(u,v)$ through $P(f)$ is written as:

$$\begin{bmatrix} u \\ v \\ 1 \end{bmatrix} = P(f) \cdot \begin{bmatrix} x \\ y \\ z \\ 1 \end{bmatrix} = P(f) \cdot \begin{bmatrix} 1 & 0 & 0 \\ 0 & 1 & 0 \\ 0 & 0 & z \\ 0 & 0 & 1 \end{bmatrix} \cdot \begin{bmatrix} x \\ y \\ 1 \end{bmatrix} = T(f,z) \cdot \begin{bmatrix} x \\ y \\ 1 \end{bmatrix}, \quad [\text{Eqn. 3}]$$

where $$T(f, z) = P(f) \cdot \begin{bmatrix} 1 & 0 & 0 \\ 0 & 1 & 0 \\ 0 & 0 & z \\ 0 & 0 & 1 \end{bmatrix} \quad [\text{Eqn. 4}]$$

comprises a 3-by-3 matrix and the symbol "•" denotes matrix multiplication. T is the Plane Projection Matrix (PPM). Equation 3 can be simplified as:

$$\begin{bmatrix} u \\ v \\ 1 \end{bmatrix} = T(f, z) \cdot \begin{bmatrix} x \\ y \\ 1 \end{bmatrix}. \quad [\text{Eqn. 5}]$$

Equation 5 maps a point (x,y) on the 2-D plane with depth z to an image pixel (u,v). The difference between P and T is that the former is a mapping from 3-D to 2-D, while the latter is from 2-D to 2-D. The inverse form of Equation 5 is:

$$\begin{bmatrix} x \\ y \\ 1 \end{bmatrix} = T(f, z)^{-1} \cdot \begin{bmatrix} u \\ v \\ 1 \end{bmatrix}. \quad [\text{Eqn. 6}]$$

Equation 6 projects a pixel (u,v) on the image plane back onto the object plane at depth z.

By way of example, it is assumed that there are two cameras whose Plane Projection Matrices are respectively T(f,z) and $T_v(f_v,z)$. Video processor 270 first back-projects a virtual pixel (u,v) from $I_v$ to the plane at z, resulting in the point (x,y,z), according to the equation:

$$\begin{bmatrix} x \\ y \\ 1 \end{bmatrix} = T_v(f_v, z)^{-1} \cdot \begin{bmatrix} u \\ v \\ 1 \end{bmatrix}. \quad [\text{Eqn. 7}]$$

Next, video processor 270 forward projects the point (x,y, z) to component image plane I according to the equation:

$$\begin{bmatrix} u' \\ v' \\ 1 \end{bmatrix} =$$

$$T(f, z) \cdot \begin{bmatrix} x \\ y \\ 1 \end{bmatrix} = T(f, z) \cdot T_v(f_v, z)^{-1} \cdot \begin{bmatrix} u \\ v \\ 1 \end{bmatrix} = M(f, f_v, z) \cdot \begin{bmatrix} u \\ v \\ 1 \end{bmatrix}. \quad [\text{Eqn. 8}]$$

The matrix M is called a "warping matrix" because it warps a pixel from the image plane of a first camera to the image plane of another camera. It is apparent that M is a function of the depth, z, and the focal lengths, f and $f_v$, respectively, of the component and virtual cameras. In summary, three types of matrices are involved: 1) the matrix P maps 3-D to 2-D; 2) the matrix T maps a regular 2-D plane to the image plane; and 3) the matrix M maps the image plane to another image plane.

Advantageously, the algorithm set forth above may be used to implement auto-focus, depth-of-field, and high-resolution functions in a compound camera without requiring complex and expensive electromechanical equipment.

Figure 4:
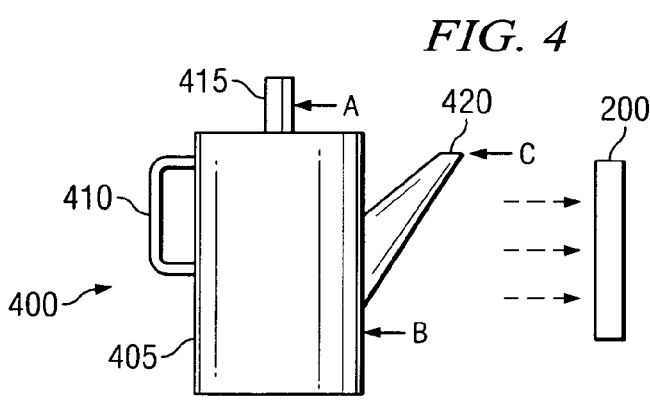
FIG. 4 illustrates the placement of the object plane (or depth plane) at several locations on the body of an object.

FIG. 4 illustrates the placement of the object plane (or depth plane) at several locations on the body of an object. The object is watering bucket 400, which comprises container 405, side handle 410, top handle 415, and spout 420. The image of watering bucket 400 is captured by compound camera system 200. According to the principles of the present invention, video processor 270 may place the object plane (or depth plane), z, at numerous locations on the body of watering bucket 400 that are visible to compound camera 200. For example, video processor 270 may place the depth plane a point B on the front surface of container 405. Alternatively, video processor 270 may place the depth plane at point A on the front of top handle 415 or at point C on the end of spout 420.

It is noted that placing the depth plane, z, at point B on the front surface of container 405 may result in the image generated by compound cameras system 200 being blurry at point C on sprout 420 and point A on top handle 415. This phenomenon is explained in FIGS. 5A and 5B.

Figure 5A:
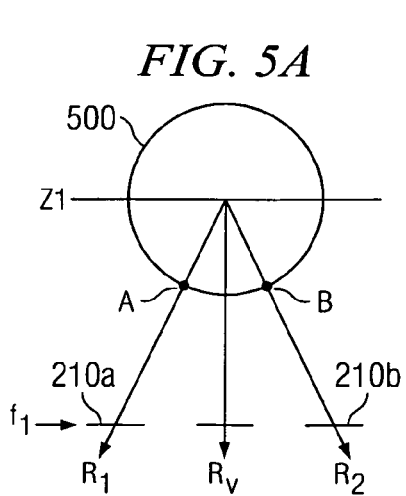
FIGS. 5A and 5B illustrate the effect of moving depth plane, Z, to different depths.
Figure 5B:
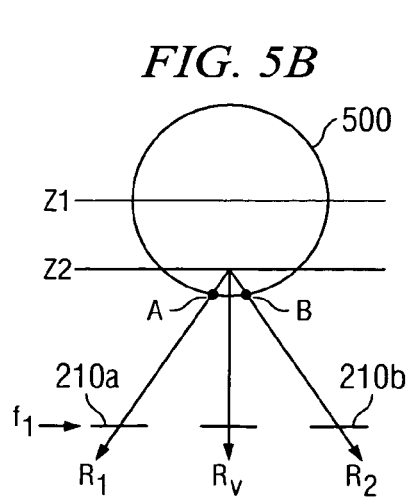

FIGS. 5A and 5B illustrate the effect of moving depth plane, Z, to different depths. Initially, the depth plane (or object plane) is at depth Z1. In FIG. 5A, $R_v$ is a virtual light ray, $R_1$ and $R_2$ are two light rays transmitted to two different image sensors 210a and 210b from circular object 500. Image sensor 210a sees the point A and image sensor 210b sees the point B. Point A and point B have different colors. Since $$I_v(R_v) = \frac{w_1 \cdot I_1(R_1) + w_2 \cdot I_2(R_2)}{w_1 + w_2},$$

the color of $R_v$ is a combination of both colors from point A and point B. This is the source of the blur that may occur in FIG. 4.

To remove the blur, a second depth plane is added at Z2, as shown in FIG. 5B. Now, because points A and B are much closer, their colors are more likely to be similar, resulting in less blur overall. This suggests that using multiple depth planes may help to reduce the blur. However, since each depth plane introduces a potential virtual image, a decision has to be made as to which pixel is the best choice for the virtual ray, $R_v$. According to the principles of the present invention, video processor 270 selects the depth plane that has the least color variance.

A traditional camera implements the auto-focus function by sliding the image plane and analyzing the resulting images. However, according to the principles of the present invention, the action of physically sliding the image plane is instead performed by video processor 270, which digitally moves a virtual depth plane in software.

Likewise, video processor 270 implements the depth-of-field function by using multiple virtual depth planes that cover the depth range of interest (e.g., from Z1 to Z2). Video processor 270 then integrates all of the potential virtual images into a final image. Video processor 270 generates the final image by selecting from each of the component virtual images groups of pixels that have the least amount of blur. This requires high levels of computation by video processor 270. However, there are no physical parts involved.

In addition to synthesizing images of large depth-of-field, video processor 270 can, at the same time, estimate the depth of scene objects. It is recalled from above that for a virtual pixel (u,v), video processor 270 may select a set of candidate depth positions $z_1, z_2, \ldots, z_m$, in the space. At each of these positions $z_i$, video processor 270 may calculate two variables: 1) color, given by the equation:

$$I_{vz}(u, v) = \frac{w_1 \cdot I_1(u_1, v_1) + w_2 \cdot I_2(u_2, v_2)}{w_1 + w_2}, \quad [\text{Eqn. 9}]$$

and 2) color variance, given by the equation:

$$\text{var}(u, v) = \quad [\text{Eqn. 10}]$$
$$\frac{w_1 \cdot |I_1(u_1, v_1) - I_{vz}(u, v)| + w_2 \cdot |I_2(u_2, v_2) - I_{vz}(u, v)|}{w_1 + w_2}.$$

Thus, for the virtual pixel (u,v), video processor 270 calculates a set of colors ($I_{v2}, I_{v2}, \ldots, I_{vm}$) and variances ($\text{var}_1, \text{var}_2, \ldots, \text{var}_m$). If the variance at $Z=z_i$ (i.e., $\text{var}_i$, i is among 1, 2, ..., m) is the smallest in the current variance set, then the final color of (u,v) is $I_{vi}$ (i.e., $I_v(u,v)=I_{vi}$), and the depth of (u,v) is z.

This may be further explained as follows. Conceptually, from each pixel on the virtual camera's image plane, video processor 270 sends out a virtual ray. The virtual ray intersects with a series of planes whose depth range covers the whole scene of interest. At each intersection between the virtual ray and the plane, video processor 270 retrieves the corresponding input rays and calculates the average color and variance. The color and depth of the intersection with the lowest variance is recorded as that of the current virtual ray. After all plane positions have been examined and all virtual pixels have been scanned, a virtual image plus its depth map is formed by video processor 270. The resolution of the depth map depends on the number of planes selected by video processor 270. More depth planes give finer depth maps.

Video processor 270 also implements a high-resolution function by selecting a virtual camera having a higher density of pixels. Video processor 270 inserts new pixels by "warping" or interpolating pixels from different component cameras. A compound camera by definition includes multiple component cameras at different locations and, therefore, different viewing angles. The component cameras see different points on the object. When the component images are combined after compensating their relative positions with respect to the virtual camera, a virtual image of higher resolution than the input ones can be synthesized. Of course, because some object points are seen by more than one component camera, the resolution enhancement is not linearly related to the number of component cameras. That is to say, N component cameras do not necessarily guarantee a virtual image of resolution N times higher.

Although the present invention has been described with an exemplary embodiment, various changes and modifications may be suggested to one skilled in the art. It is intended that the present invention encompass such changes and modifications as fall within the scope of the appended claims.

What is claimed is:

1. A compound camera system comprising:
   multiple component cameras capable of generating image data of an object; and
   a processor capable of generating an enhanced virtual image using the image data, the processor capable of generating the enhanced virtual image by:
     generating a first component virtual image at a first depth plane;
     generating a second component virtual image at a second depth plane;
     selecting pixels from the first component virtual image that have less blur than corresponding pixels from the second component virtual image;
     selecting pixels from the second component virtual image that have less blur than corresponding pixels from the first component virtual image; and
     inserting the selected pixels from the first and second component virtual images into the enhanced virtual image.

2. The compound camera system of claim 1, wherein the processor is capable of comparing the blur of the pixels in the first and second component virtual images by comparing an amount of color variance associated with the pixels in the first and second component virtual images.

3. The compound camera system of claim 1, wherein the processor is capable of generating the first component virtual image by:
   back-projecting virtual pixel data to generate point data located at a first depth plane of the object;
   projecting the point data to generate first pixel data located at an image plane of a first of the component cameras;
   projecting the point data to generate second pixel data located at an image plane of a second of the component cameras; and
   combining color of the first pixel data and color of the second pixel data.

4. The compound camera system of claim 3, wherein the processor is capable of combining the colors of the first and second pixel data by determining a weighted average of the colors of the first and second pixel data.

5. The compound camera system of claim 3, wherein:
   the processor is capable of using an inverse Plane Projection Matrix to back-project the virtual pixel data;
   the processor is capable of using a first Plane Projection Matrix to project the point data to generate the first pixel data; and
   the processor is capable of using a second Plane Projection Matrix to project the point data to generate the second pixel data.

6. The compound camera system of claim 3, wherein the processor is capable of adjusting a focus of the compound camera system by back-projecting the virtual pixel data to generate point data located at a second depth plane of the object.

7. The compound camera system of claim 1, wherein each of the component cameras comprises one of: a still camera and a video camera.

8. The compound camera system of claim 1, wherein the enhanced virtual image has a higher pixel density than the image data from any of the component cameras.

9. A method comprising:
   receiving image data of an object; and
   generating an enhanced virtual image using the image data by:
     generating a first component virtual image at a first depth plane;
     generating a second component virtual image at a second depth plane;
     selecting pixels from the first component virtual image that have less blur than corresponding pixels from the second component virtual image;
     selecting pixels from the second component virtual image that have less blur than corresponding pixels from the first component virtual image; and inserting the selected pixels from the first and second component virtual images into the enhanced virtual image.

10. The method of claim 9, further comprising:
comparing an amount of color variance associated with the pixels in the first and second component virtual images in order to determine which pixels in the first and second component virtual images have less blur.

11. The method of claim 9, wherein generating the first component virtual image comprises:
back-projecting virtual pixel data to generate point data located at a first depth plane of the object;
projecting the point data to generate first pixel data located at an image plane of a first of a plurality of component cameras;
projecting the point data to generate second pixel data located at an image plane of a second of the plurality of component cameras; and
combining color of the first pixel data and color of the second pixel data.

12. The method of claim 11, wherein combining the colors of the first and second pixel data comprises determining a weighted average of the colors of the first and second pixel data.

13. The method of claim 11, wherein:
back-projecting the virtual pixel data comprises using an inverse Plane Projection Matrix;
projecting the point data to generate the first pixel data comprises using a first Plane Projection Matrix; and
projecting the point data to generate the second pixel data comprises using a second Plane Projection Matrix.

14. The method of claim 11, further comprising:
adjusting a focus of a compound camera system that includes the component cameras by back-projecting the virtual pixel data to generate point data located at a second depth plane of the object.

15. Software stored on a non-transitory medium such that when executed by a processor is configured to:
generate a first component virtual image at a first depth plane and a second component virtual image at a second depth plane using image data, the image data comprising image data of an object from a plurality of component cameras;
select pixels from the first component virtual image that have less blur than corresponding pixels from the second component virtual image;
select pixels from the second component virtual image that have less blur than corresponding pixels from the first component virtual image; and
insert the selected pixels from the first and second component virtual images into an enhanced virtual image.

16. The software of claim 15, further configured to:
compare an amount of color variance associated with the pixels in the first and second component virtual images in order to determine which pixels in the first and second component virtual images have less blur.

17. The software of claim 15, wherein the software in generating the first component virtual image
back-projects virtual pixel data to generate point data located at a first depth plane of the object;
projects the point data to generate first pixel data located at an image plane of a first of the component cameras;
projects the point data to generate second pixel data located at an image plane of a second of the component cameras; and
combines color of the first pixel data and color of the second pixel data.

18. The software of claim 17, wherein the software in combining the colors of the first and second pixel data determines a weighted average of the colors of the first and second pixel data.

19. The software of claim 17, wherein:
the software in back-projecting the virtual pixel data uses an inverse Plane Projection Matrix;
the software in projecting the point data to generate the first pixel data uses a first Plane Projection Matrix; and
the software in projecting the point data to generate the second pixel data uses a second Plane Projection Matrix.

20. The software of claim 17, further configured to:
adjust a focus of a compound camera system that includes the component cameras by back-projecting the virtual pixel data to generate point data located at a second depth plane of the object.

* * * * *